United States Patent [19]
Williamson

[11] Patent Number: 5,516,156
[45] Date of Patent: May 14, 1996

[54] HYDRAULIC PORT FITTINGS

[75] Inventor: Nigel D. L. Williamson, Fort Wayne, Ind.

[73] Assignee: NWD International, Inc., Morencie, Mich.

[21] Appl. No.: 230,972

[22] Filed: Apr. 21, 1994

Related U.S. Application Data

[63] Continuation-in-part of PCT/US92/09035, Oct. 22, 1992, which is a continuation-in-part of Ser. No. 782,409, Oct. 25, 1991, abandoned.

[51] Int. Cl.$^6$ .................................................. F16L 19/00
[52] U.S. Cl. ........................ 285/212; 285/190; 285/382.7
[58] Field of Search .................................. 285/212, 190, 285/382.7, 332.3

[56] References Cited

U.S. PATENT DOCUMENTS

| | | | |
|---|---|---|---|
| 2,496,149 | 1/1950 | Cahenzli, Jr. | 285/126 |
| 2,826,438 | 3/1958 | Woodling | 285/342 |
| 2,942,895 | 6/1960 | Lyon | 285/212 |
| 3,003,795 | 10/1961 | Lyon | 285/212 |
| 3,145,035 | 8/1964 | Hanback | 285/110 |
| 3,151,893 | 10/1964 | Lyon | 285/158 |
| 3,151,896 | 10/1964 | Kody | 285/212 |
| 3,201,153 | 8/1965 | Currie | 285/249 |
| 3,219,366 | 11/1965 | Franck | 285/190 |
| 3,315,988 | 4/1967 | Schroter | 285/190 |
| 3,967,838 | 7/1976 | Legras | 285/190 |
| 4,362,324 | 12/1982 | Kelly | 285/190 |
| 4,934,742 | 6/1990 | Williamson | 285/212 |
| 4,955,643 | 9/1990 | Bona et al. | 285/190 |
| 5,372,389 | 12/1994 | Tam et al. | 285/190 |

FOREIGN PATENT DOCUMENTS

| | | |
|---|---|---|
| 1507625 | 11/1967 | France . |
| 861036 | 12/1952 | Germany ................. 285/190 |
| 53477 | 1/1967 | Germany . |
| 1918012 | 12/1970 | Germany ................. 285/190 |
| 507838 | 6/1939 | United Kingdom .......... 285/190 |
| 718264 | 11/1954 | United Kingdom . |
| 1227037 | 3/1971 | United Kingdom . |
| 2207722 | 2/1989 | United Kingdom . |

*Primary Examiner*—Eric K. Nicholson
*Attorney, Agent, or Firm*—Baker & Daniels

[57] ABSTRACT

The present invention relates to an improved hydraulic coupling which forms contact seals to fluidly connect a tapered port with a tube having a threaded connecting portion. The contact seals may be metal-to-metal seals, or alternatively may include a resin polymer element. For connecting a tube directly in the port, one embodiment of the invention includes an outwardly extending lip on an expanded portion of the tube and a tube nut rim wherein the tube nut engages the expanded portion and by tightening the tube nut, the tube lip deforms on the tapered port and the tube nut rim deforms on both the tapered port and the tube. Another embodiment of the invention provides a fluid coupling for a tube which is transverse to the port, allowing for flow redirection in the coupling similar to the flow redirection in prior art "banjo" couplings. The body of the transverse coupling includes a lip which deforms on the tapered surface of the port, and the body also includes a tapered surface on which a rim of the bolt contacts, thereby providing a contact seal at both potential leak points. Optionally, o-rings may be added to provide additional seals. Both embodiments may be designed not to seal without the application of tool generated torques.

11 Claims, 13 Drawing Sheets

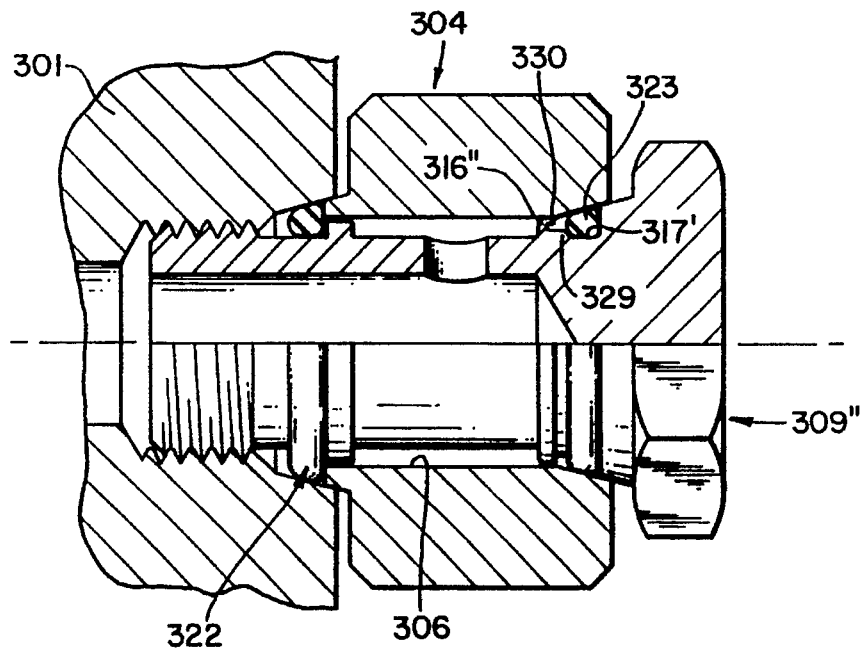
FIG. 14
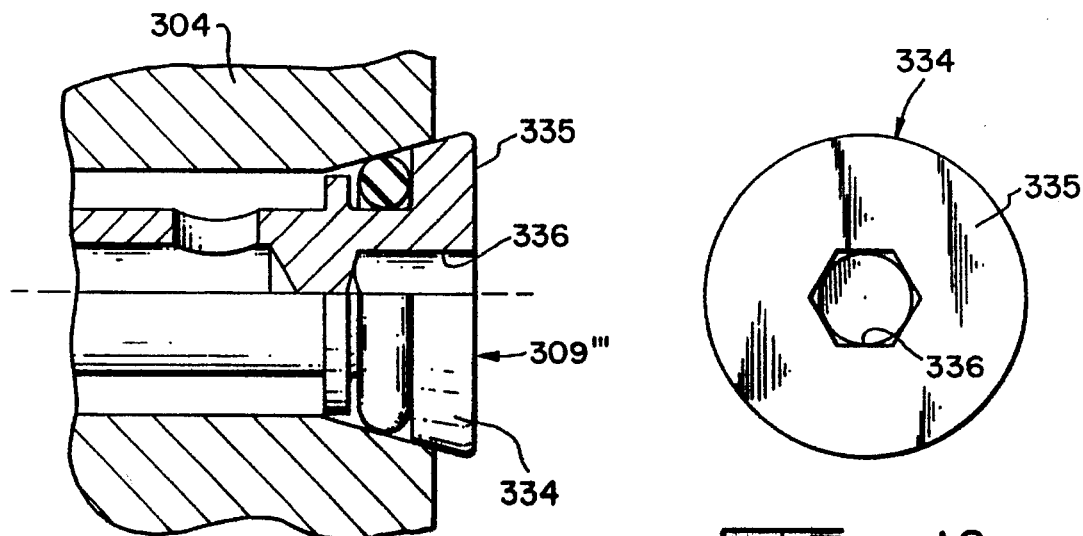
FIG. 15
FIG. 16

HYDRAULIC PORT FITTINGS

CROSS-REFERENCE TO RELATED APPLICATIONS

The present application is a continuation-in-part of copending International Patent Application No. PCT/US92/09035, filed Oct. 22, 1992, that designated the United States, which is a continuation-in-part of U.S. patent application Ser. No. 07/782,409, filed Oct. 25, 1991, now abandoned.

BACKGROUND OF THE INVENTION

1. Field of the Invention

The present invention relates to hydraulic couplings. More specifically, the field of the invention is that of hydraulic port fittings such as used in automobiles, aircraft, and the like.

2. Related Art

There are many port fittings on the marketplace currently which are designed to connect tubing or hydraulic hose to power equipment such as brake calipers etc. The most frequently used methods of attachment are the tube-to-port and the "banjo" type fittings. The former is used in brake, power steering, and air conditioning systems, and the latter predominantly in brake systems.

The problem with both technologies is that they are prone to leaks which are both expensive and dangerous. Warranty and in-house costs of fixing such leaks may become quite large, and the environmental consideration of the effects of such loss of contaminating fluids cannot be ignored.

Traditionally, the hydraulics supply industry has recommended better surface finishes and tighter tolerances in manufacture in order to minimize the potential for leaks. This has, however, failed to adequately answer the problem. To adequately address this problem, the causes of the leaks in two prior art port fittings must be examined. Descriptions of the tube-to-port and "banjo" port fittings are presented below which include an examination of their inherent inadequacies.

TUBE-TO-PORT FITTINGS

The prior art tube-to-port fitting, as shown in FIG. 1, comprises a tube 1 which includes a raised bead 2 which sits behind reduced diameter portion 3. This diameter 3 is required to be of very smooth surface finish. Often, the tube-to-port fitting also includes an o-ring retention feature 4. The periphery of bead 2 is severely stressed during the formation process, and these stresses can lead to cracking, though proper specification of tubing composition may ameliorate this problem. However, specification of required chemical composition, heat treatment, hardness, wall thickness, or specific manufacturing methods for the tubing further adds to the expense of the fitting.

Tube 1 is assembled to a mating port 5 with tube nut 6. The port 5 has a very finely machined internal configuration which is required to have a fine surface finish in order to seal reliably.

When assembled with the required o-ring 11, as in FIG. 2, the bead on the tube portion comes into tight axial abutment with the flat-faced feature 9 in the bottom of port 5. O-ring 11 is driven down taper 10 of port 5 and forms a seal in the tapered area and along a portion of the parallel interface between surfaces 7 and 8.

Although not immediately apparent why a coupling of this design should be the source of so many leaks, detailed analysis reveals that the interface is not ideal for reliable long-term service. The following paragraphs describe problems inherent in the prior art tube-to-port fitting.

One problem involves the abutment of tube bead with flat-bottomed base of the port which is essentially face-to-face, wherein the bead is put into a plastic deformation by the pressure exerted by the tube nut. There is very little elastic resiliency in the interface. Once the metal of the tube takes a set after assembly, subsequent pressurization forces, vibration, flexure, heating and cooling, etc. may give rise to a gap which will only worsen over time.

Another problem involves the orientation of the o-ring. Positioned in both the tapered area and the parallel interface, the o-ring is deformed during the assembly operation into a kidney-like shape, with a portion remaining in the relatively large tapered portion of the port. When the o-ring takes a set over time, it will be incapable of movement within the pocket, being trapped by the tapered portion. In order for an o-ring to work properly, it must be capable of moving in response to pressure differentials. Therefore, the improper positioning of the o-ring in the port interface tends to prevent the o-ring from moving and thus degrades long term performance of the fitting.

An additional problem involves the fact that the only seal in the tube-to-port fitting is provided by the o-ring. Without the o-ring in place, the tube does not seal when assembled to the port, even against low pressures. Also, misalignment of components may result in a damaged o-ring, and with this frequent problem a leak will be immediately apparent.

A further problem exists in a situation where the tube-to-port fitting is used in air conditioning systems, due to the searching nature of refrigerants. O-rings are permeable to freon, especially under pressure. If the o-ring is the only seal in a system, a constant and irretrievable loss of refrigerant to the atmosphere occurs through the permeable o-ring. This loss is slow at first, due to the slowness of permeation through the o-ring, but it becomes more rapid as the o-ring takes a set over time, and larger leak-paths occur.

"BANJO" FITTINGS

"Banjo" fittings are so termed because of their shape, which usually comprises of a tube brazed onto a round component, giving rise to a substantially banjo-shaped assembly.

Referring to FIGS. 3 and 4, which show a prior art "banjo" fitting, a typical banjo fitting is comprised of body 102 through which bolt 103 is assembled. The combination of body 102 and bolt 103 is then assembled to port 101. Sealing of the body/bolt assembly is accomplished with copper (typically) washers 104 and 105, which are placed each side of body 102. Large torques (applied in the radial direction of arrow T of FIG. 4) are employed to obtain a seal between components, which sometimes cannot be sealed. A common failure of this assembly is to snap the bolt or strip the threads of the port while striving to attain sealing contact.

The "banjo" fittings are useful because of their inherent assembly benefits in situations where time taken to assemble and ease of access to components are important considerations. "Banjo" fittings are assembled from the front, and assembly can be effected with power tools. This is not true of other fittings which perform the function served by "banjo" fittings, that of supplying fluid to a component through a 90 degree change of direction or other similar reorientation of fluid flow.

A drawing of an assembled prior art "banjo" fitting is shown in FIG. 4, where body 102, shown in partial cut-away, is recessed internally to create flow chamber 124 for pressurized fluid. A recessing operation is required to be done to body 102, rather than in bolt 103, in order to retain as much tensile strength in bolt 103 as possible. If bolt 103 were reduced in diameter to create a flow chamber, insufficient material would remain in bolt 103 to withstand the massive assembly torques required to obtain a seal. The recessing operation required for body 102 is expensive and difficult to control. Also, bolt 103 must be made of relatively high tensile material in order to resist tensile failure due to high torques, and such materials are hard to machine which further complicates the manufacture of prior art "banjo" fittings.

One problem with prior art "banjo" fittings involves the four potential leak-paths in any standard banjo fitting, one on each side of the metal washers 104 and 105 which are located at sealing points 120, 121, 122 and 123 of FIG. 4. Also a problem is that massive torques are required to attain a seal, which in turn, requires a high tensile strength bolt, and an internally recessed body. These are expensive requirements for the manufacture of the "banjo" fitting.

An additional problem involves the lack of any secondary seal in the port interface. Should one of the four metal-to-metal interfaces develop a leak, the only way of overcoming it is to impart greater torque to the assembly. This regularly leads to tensile failures of bolts or stripped threads on bolts or in ports.

Further problems involve shape, size and alignment of the prior art "banjo" fittings. Flow characteristics within the fitting are primarily derived from consideration of tensile strengths rather than from system demand. This often leads to flow restrictions which are not desirable. Also, the face-to-face association of components requires close control in order to form an adequate seal. Concentricity and squareness of through-bores on bodies must be carefully maintained in production, and aligned accurately during assembly, if a seal is to be obtained.

What is needed is an improved hydraulic coupling which utilizes the elastic properties of the materials.

Also needed is an improved hydraulic coupling which does not excessively deform o-rings in the coupling.

A further need is for an improved hydraulic coupling which includes secondary seals.

An additional need exists for an improved hydraulic coupling for refrigerant systems which includes metal-to-metal seals.

A still further need exists for an improved hydraulic coupling which minimizes the number of potential leak paths.

Yet another need exists for an improved hydraulic coupling which requires less torque for assembly.

SUMMARY OF THE INVENTION

The problems highlighted above, though seeming very different, are in many ways linked. Primarily both systems have single sealing methods, one being elastomeric only, and the other being only the metal-to-metal plastic deformation. Another common feature is that there is little invocation of elastic memory in either design, as plastic deformation of components occurs in both designs as a result of their face-to-face associations.

The elastic deformation of mating components is preferred because the elastic memory of the material (either metal or rubber and the like) imparts a continuous sealing force. In comparison, plastic deformation of the material, which permanently deforms the fitting components, imparts no additional sealing force. Both metals and rubber type materials are subject to both forms of deformation, as metal material may be plasticly deformed by high torque when assembled while elastic materials may be plasticly deformed by setting over time.

Embodiments of the present invention impart multiple seals to the port interface, and use elastic memory of metallic components in the interface where possible. This is attained by the use of elastic components in those instances where such is possible or desireable in conjunction with abutting tapered metallic surfaces which allow for the generation of an interface the integrity of which is enhanced by elastic memory. With ports made of softer materials, a metallic component having a complementary taper or a resin polymer component may be used to create a contact seal of similar integrity. The acute tapered metallic surfaces provides a high unit loading which ameliorates the need for the expensive materials needed for receiving the high torques required with prior art fitting components.

One embodiment involves a modified tube-to-port fitting system. This system requires a special port which is internally threaded to receive a tube nut. At the base of the port is a taper of a relatively acute angle. Similar ports currently exist, though they tend to be much more complicated than the port of this design. This port may be made simply by using a form drill to impart its thread minor diameter and the taper at the same time, no special surface finishes are required. The taper starts at the threaded minor diameter and progressively reduces inwardly. There are no complicated features or tight dimensional/surface finish requirements.

A formed tube and tube nut is assembled into the port. This assembly, however, does not comprise a beaded tube, but makes use of an expanded tube end which may include a lip for o-ring retention. The nut includes a shoulder which abuts the expanded tube end and drives it into the port, forcing the lip (where used) into the tapered surface of the port. This lip may also serve another purpose, and that is to prevent sealing during hand-tight assembly of components. Without this lip interfering with the tapered seat in the port during hand tight assembly of components, prior to torquing of components with wrenches, the o-ring would seal, and the fact that assembly torques had not been applied to create the metal-to-metal seal would not be obvious. By wrench tightening the nut, the lip is driven into sealing engagement with the tapered surface to form a primary metal-to-metal seal. For ports made of softer materials, the lip may be formed with a complementary taper to facilitate creation of the primary metal-to-metal seal.

The nut of the coupling has a thin-walled leading portion that conforms with the seat at the bottom of the port during assembly to create a metal-to-metal seal both with the taper of the port and with the outside of the expanded portion of the tube. For ports made of softer materials, a resin polymer or metallic ring may be substituted for the leading portion of the nut to create a contact seal both with the taper of the port and with the outside of the expanded portion of the tube. Optionally, an o-ring may be placed on the expanded portion of tube in front of the thin-walled section of the tube nut, with the o-ring contacting the expanded portion of tube and the taper in the port during assembly, but which is not crushed as a gasket in the assembly. The lip, when featured, contacts the taper of the port prior to the thin-walled portion of the tube nut making contact with the taper during assembly. The o-ring is placed on the expanded portion of tube, between the lip at the leading end, and the thin-walled portion of the tube nut, such that when assembled the o-ring is not compressed, but is in contact with the expanded portion of tube, the port taper, and the leading end of the thin-walled portion of the tube nut.

The invention also includes an embodiment wherein the port includes another tube and a receiving nut, providing an improved tube to tube coupling.

Another embodiment involves a transverse coupling adapted to function similarly to the "banjo" hydraulic fitting. The "banjo" type of connection allows for a change in direction of fluid flow through the coupling. The port for the "banjo" type fitting has internal threads and a taper at the outer end which mates with a body component which bears a complementary external taper. The body component is bored to accept a threaded bolt, which may engage the threads of the port. At the distal end of the body is located an internal taper which receives a complementary tapered surface on the bolt, such that when the coupling is assembled, the mating tapers are driven together to create metal-to-metal seals between port, body and bolt. Optionally o-rings may be placed in front of the two external tapers on the bolt and the body. The o-rings contact the leading ends of the external tapered surfaces, and contact the internal tapered surfaces, in a manner which allows movement of the o-rings in response to pressure differentials. The o-rings are not crushed, as a gasket, during assembly.

The present invention lowers the number of leak paths associated with "banjo" fittings from four to two, and, when o-rings are used, each potential leak path is controlled by two separate and individually effective seals.

The bolts of the fitting do not have to be made of high tensile materials, so that regular mild steel or even brass may be used. Also, the flow chamber is provided by reducing the diameter on the bolt rather than forming the chamber internally in the body. This is a much simpler operation and considerably less expensive. As assembly torques are so much lower than with conventional "banjo" fittings, it is possible to make the bolt with a socket head rather than an external hexagon head. This makes a very attractive, clean-lined assembly which is lighter in weight than the hex-head bolts. Flow characteristics need not be changed with this design, as there is considerable scope for reduction of wall thickness on both bolt and body, which need only be predicated on pressure retention within the system, rather than on assembly torques. Substantial savings may be enjoyed by the automotive and similar industries which have traditionally spent large sums curing persistent leaks at interfaces of the prior art banjo fittings.

The present invention, in one form, is a hydraulic coupling comprising a port, a conduit, and a connector. The port includes an opening, a portion defining a passageway in communication with said opening, an internally threaded portion in communication with said passageway, and a tapered surface facing said opening. The conduit provides a means of conduction of fluid through the port, and may include a lip which deforms into sealing contact with the tapered surface at the bottom of the port. The connector sealingly secures the conduit to the port, and includes a rim which deforms into sealing contact with the conduit. The connector includes an externally threaded portion adapted to engage the internally threaded portion of the port so that the threaded engagement forces the lip into sealing contact with the tapered surface of the port and forces the rim into sealing contact with both the taper of the port and the conduit.

One object of the present invention is to provide an improved hydraulic coupling which utilizes the elastic properties of the materials.

Also an object is to provide an improved hydraulic coupling which does not excessively deform o-rings in the coupling.

A further object is to provide an improved hydraulic coupling which includes secondary seals.

An additional object is to provide an improved hydraulic coupling for refrigerant systems which includes metal-to-metal seals.

A still further object is to provide an improved hydraulic coupling which minimizes the number of potential leak paths.

Yet another object is to provide an improved hydraulic coupling which requires less torque for assembly.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 14 is a side view, in partial cross-section, of the coupling of FIG. 13 after tightening with a tool;

FIG. 15 is a side view, in partial cross-section, of a third embodiment of the transverse coupling of the present invention having a socket head;

FIG. 16 is an end view of the socket head of FIG. 15.

Figure 1:
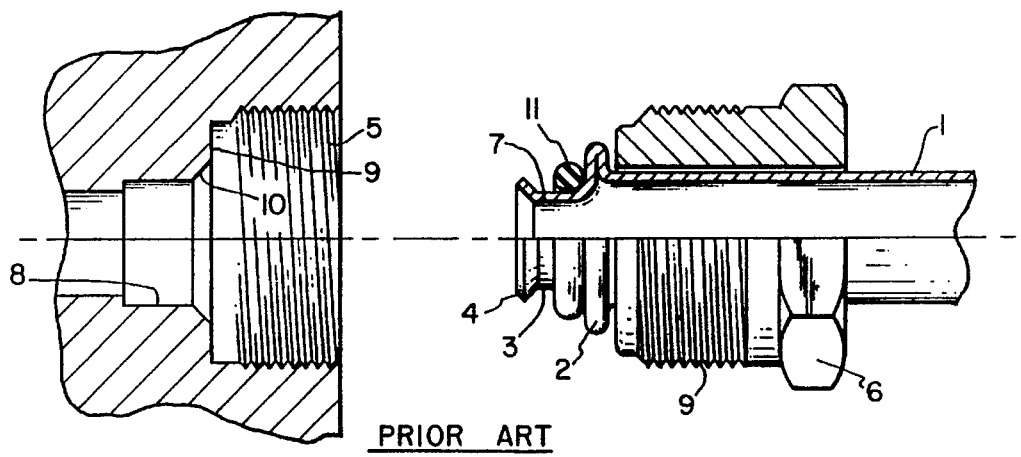
FIG. 1 is a side view, in partial cross section, of a prior art tube-to-port coupling before assembly.
Figure 2:
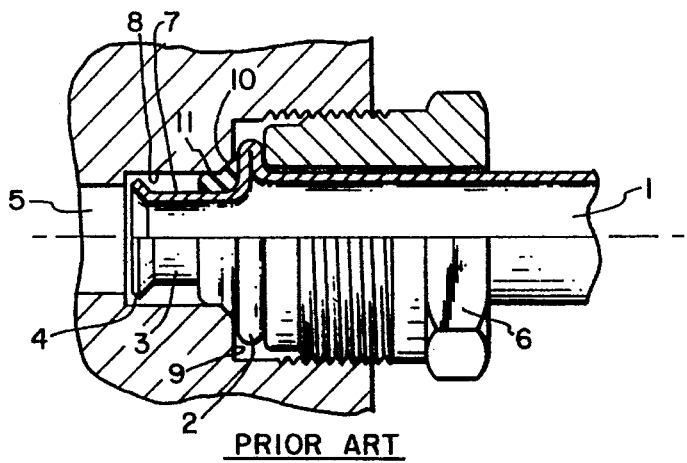
FIG. 2 is a side view, in partial cross section, of a prior art tube-to-port coupling assembled.
Figure 3:
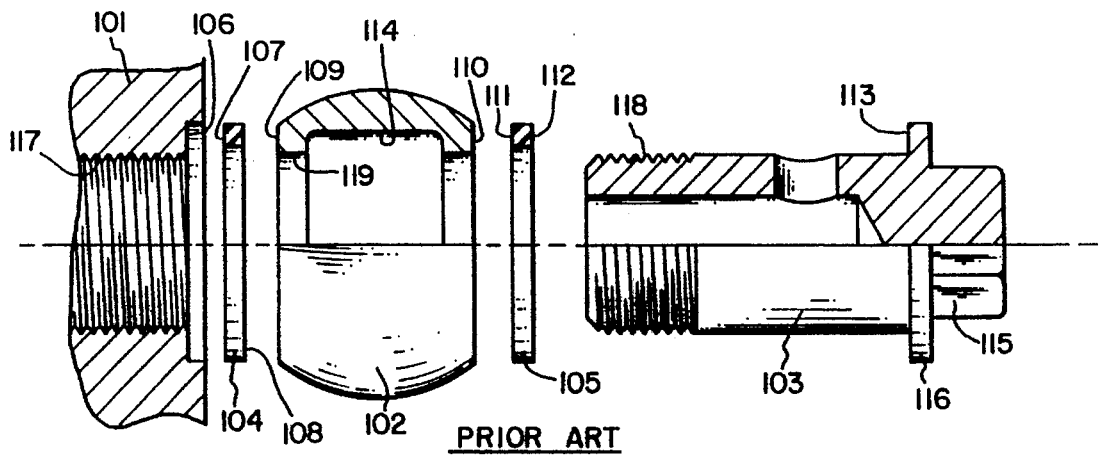
FIG. 3 is a side view, in partial cross section, of a prior art "banjo" coupling before assembly.
Figure 4:
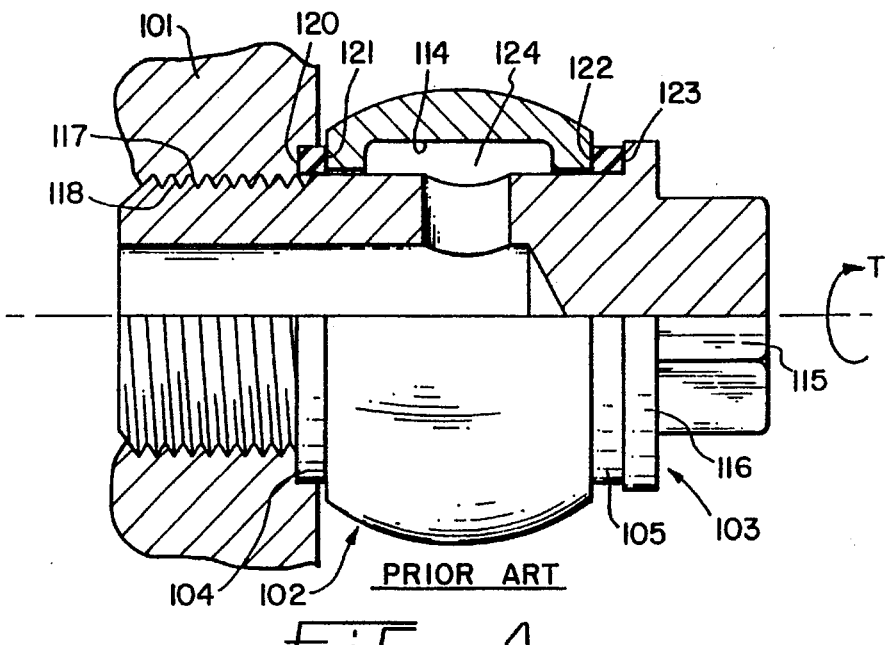
FIG. 4 is a side view, in partial cross section, of a prior art "banjo" coupling assembled.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

The present invention relates to hydraulic couplings, and particularly to couplings which utilize the elastic properties of materials, for example metals or o-rings, to form sealing contact between mating components.

Figure 5:
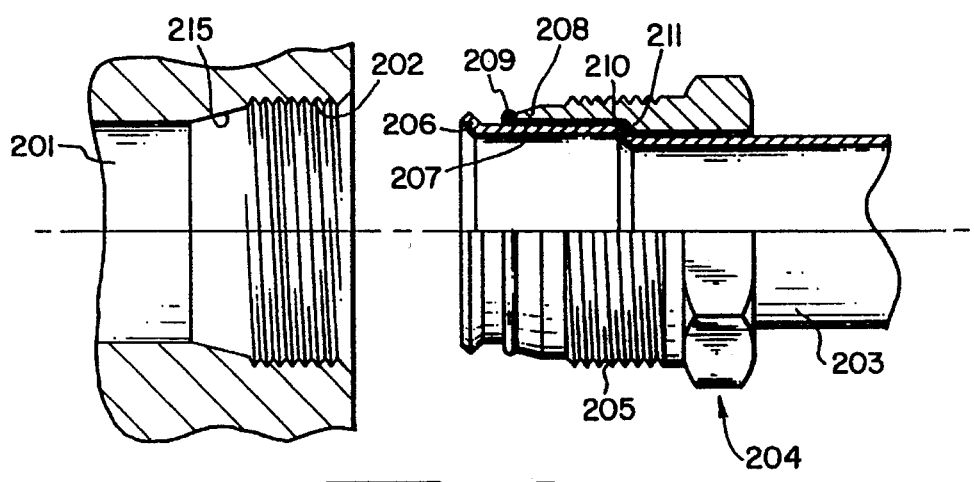
FIG. 5 is a side view, in partial cross section, of a tube-to-port coupling of the present invention before assembly.
Figure 6:
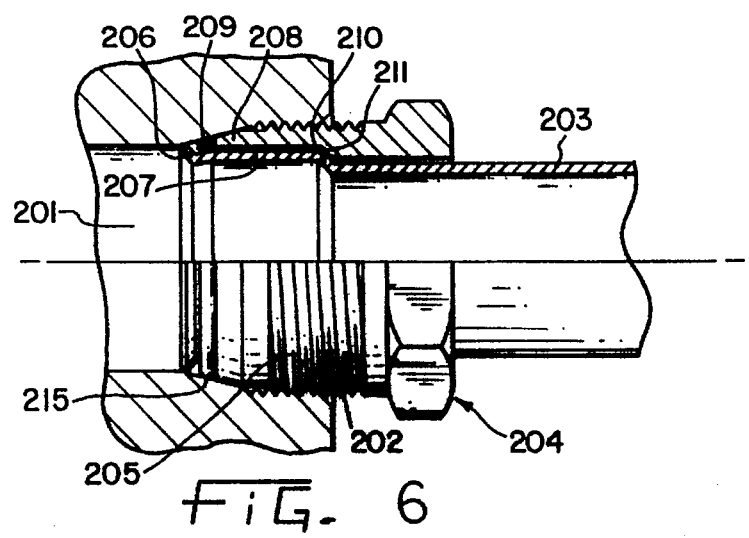
FIG. 6 is a side view, in partial cross section, of the tube-to-port coupling of FIG. 5 assembled.
Figure 7:
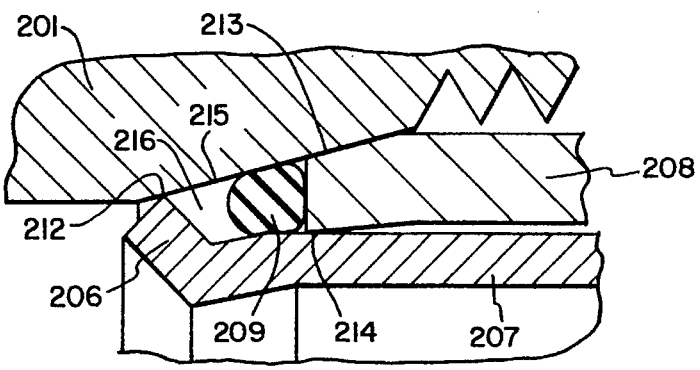
FIG. 7 is an enlarged sectional view of the abutting portions of the port, nut, and tube of FIG. 6.
Figure 8:
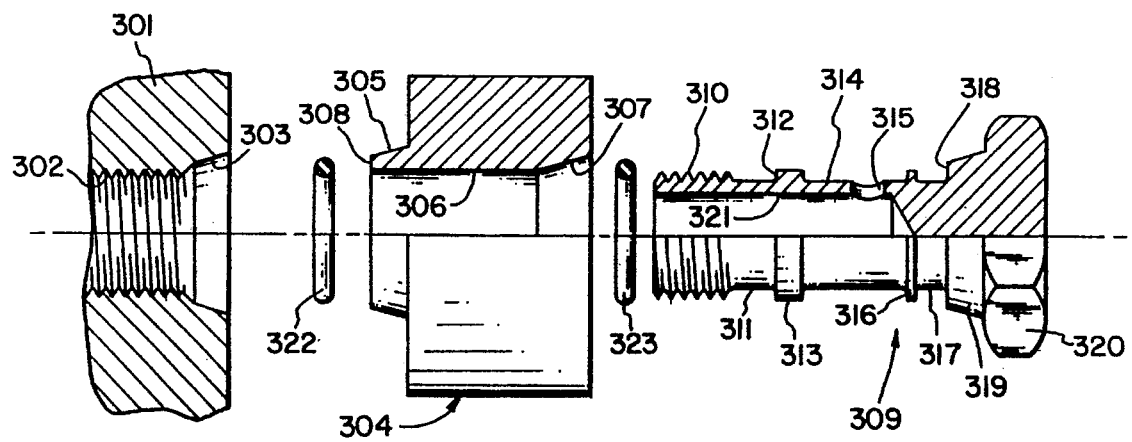
FIG. 8 is a side view, in partial cross-section, of the transverse hydraulic coupling of the present invention before assembly.

A first embodiment of the present invention is the tube-to-port coupling shown in FIGS. 5–7. Port body 201 contains an internally defined passageway for fluid communication, and has internal threads 202 for engaging tube nut 204. Tube nut 204 is disposed over expanded portion 207 of tube 203 and includes an end having a relatively thin wall or rim 208. Also, shoulder portion 211 of nut 204 abuts transition portion 210 of tube 203. Thin wall 208 may include a taper to match tapered surface 215 of port 201, although such a taper is not necessary to practice the present invention. Thin wall 208 of nut 204 is designed to conform with tapered surface 215 at the bottom of port 201 during assembly, and impinges on the outside of expanded portion 207 of tube 203. Alternatively, o-ring 209 may be included for additional sealing security where desired. In many situations, o-rings are not acceptable components in hydraulic or gas systems, and the coupling functions properly either with or without o-ring 209. Where no such restriction on the use of o-rings exists, then the use of o-ring 209 will render the assembly even more reliable in the long term.

Tube nut 204 is connected to port 201 by the engagement of external threads 205 of nut 204 with internal threads 202 of port 201. When manually assembled, lip 206 on expanded portion 207 of tube 203 contacts tapered surface 215 ahead of any contact with o-ring 209. This ensures that there will be a visible leak from the assembly in the event that wrench tightening has not occurred. Upon the application of sufficient torque during wrench tightening of nut 204, shoulder portion 211 forces expanded portion 207 into port 201 causing lip 206 to contact and deform on tapered surface 215 creating a metal-to-metal interface between lip 206 and tapered surface 215 which itself seals against pressure. As wrench tightening continues, o-ring 209 is brought into contact with tapered surface 215, and finally, thin wall 208 of tube nut 204 contacts tapered surface 215. When final wrench tightening torque is applied, thin wall 208 of tube nut 204 conforms with tapered surface 215 in port 201, and is driven down into contact with expanded portion 207 of tube 203. The engagement of expanded portion 207 and nut 204 forms a second metal-to-metal seal as a back-up to the seal between lip 206 and tapered surface 215. O-ring 209, which occupies the space between the metal-to-metal seals of the assembly, sits in pocket 216 so formed and constitutes a third seal in the assembly.

The three seal system of the present invention is much more effective than the single elastic seal which exists with the prior art tube-to-port fitting. Referring to FIG. 7, seal 212 is formed between lip 206 and tapered surface 215, additional seals 213 and 214 are formed between thin wall 208 and both tapered surface 215 and expanded portion 207, respectively, and another seal is formed by o-ring 209. Additional benefits are also derived from the presence of metal-to-metal seals when used with air conditioning refrigerants which are capable of permeation through elastomeric seals. The existence of metal-to-metal seals prevents even the slightest permeation leaks, and, even if the metal seals failed, they would significantly slow the permeation rate of refrigerant through the interface.

The tube to port coupling of FIGS. 5–7 is assembled by inserting nut 204 into port 201 and threadably engaging threads 205 of nut 204 with threads 202 of port 201. Continuing to rotate nut 204, threads 205 and 202 engage until lip 206 contacts tapered surface 215. With manual or hand tightening of nut 204, o-ring 209 would not yet be in contact with tapered surface 215, and a leak would be apparent if pressurized fluid was introduced through the interface. By further tightening using a wrench, nut 204 may be rotated so that lip 206 is deformed on tapered surface 215. Also, optional o-ring 209 is positioned in sealing contact with tapered surface 215. With further wrench tightening, thin wall 208 comes into contact with tapered surface 215 and is thus deformed and forms a seal on tapered surface 215. Finally, thin wall 208 is urged inwardly until it is deformed into sealing contact with expanded portion 207. The torque required to deform lip 206 and bring nut 204 into sealing contact is relatively small in comparison to the torques required with prior art fittings because the narrow taper of surface 215 facilitates deformation of lip 206.

Additionally, with a shallow angle in the port, the unit loading of the mating components which is generated during assembly is exceptionally high, enhancing the potential for a reliable seal. The nature of a taper is such that elastic memory is invoked between mating tapered surfaces, thereby ensuring long-term integrity of the interface, even under the most aggressive influences such as vibration, heating and cooling, impulse, flexure, etc.

In one form of the invention, tube 203 initially has an outer diameter which is greater than the inner diameter of nut 204. The coupling is formed by first compacting an end of the tube and placing the nut on the compacted portion. Next, the compacted tube end is again expanded to an extent so that the nut is captured on the tube, and the lip is formed. The difference between the compacted portion and the outside diameter of the tube may be as little as a few thousandths of an inch, however, this differential is sufficient to capture the nut. The differential between the outer diameter of the tube and the outer diameter of the compacted portion of the tube is in the range of 0.010 inches to 0.050 inches, more particularly in the range of 0.015 inches to 0.030 inches, and specifically about 0.020 inches.

A transverse hydraulic coupling, which resulted from consideration of the same requirements, is a second embodiment of the present invention. The transverse coupling includes a tapered metal-to-metal interface backed up by an optional o-rings which are shown in FIGS. 8–11. The transverse coupling comprises port 301, body 304, and bolt 309. Port 301 has internal threads 302 and a tapered surface 303 into which fits external taper 305 of body 304. Body 304 defines axial passageway 306 which is in fluid communication with port 301, and includes annular surface 308 facing port 301. At the distal end of body 304 is an internal taper 307 which mates with external taper 319 on the bolt 309. Bolt 309 has surfaces 311 and 317 which may support optional o-rings 322 and 323 in pockets 327 and 328, respectively. Pocket 327 is defined between surface 311, tapered surface 303, and annular surfaces 312 and 308 of bolt 309 and body 304, respectively. Pocket 328 is defined between extension 316, surface 317, annular surface 318, and tapered surface 307.

During assembly, if o-rings are desired then o-ring 323 is first placed on surface 317. Bolt 309 is then assembled into body 304 and o-ring 322 is placed on surface 311. In the situation where o-rings 322 and 323 are used, which will be in the majority of cases, the fitting formed by bolt 309 and body 304 is held together by o-ring 323, which is an advantage during final attachment to port 301.

Figure 9:
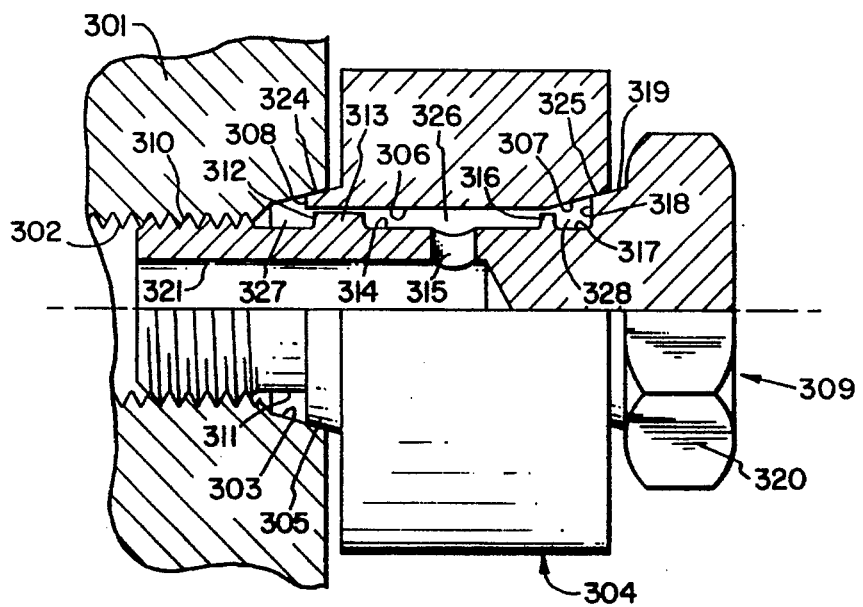
FIG. 9 is a side view, in partial cross-section, of the coupling of FIG. 8 assembled without o-rings.
Figure 10:
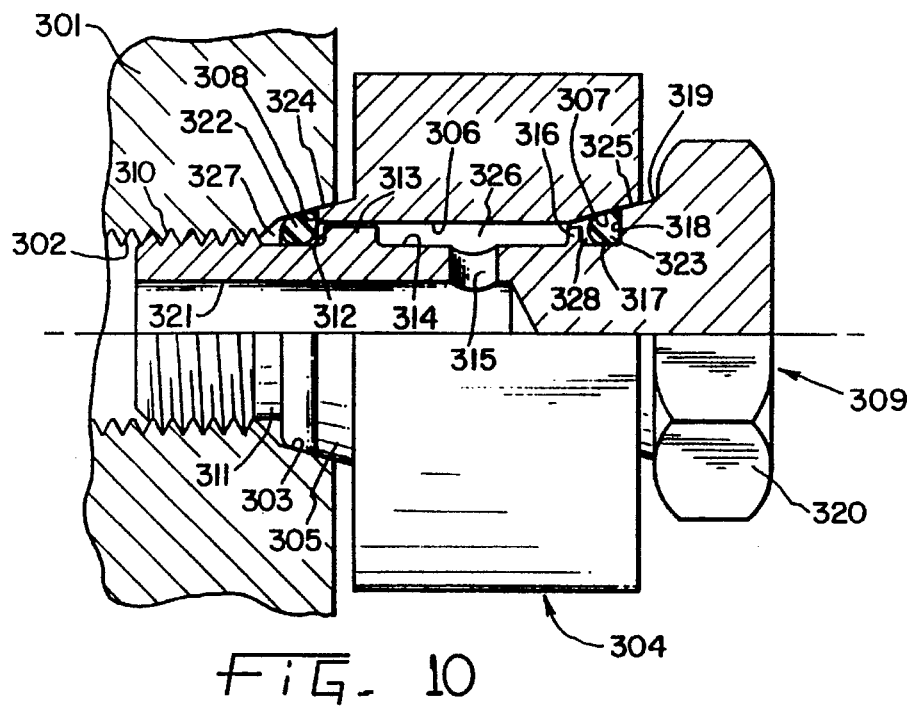
FIG. 10 is a side view, in partial cross-section, of the coupling of FIG. 8 assembled with o-rings.

Once bolt 309 is assembled through body 304, the bolt/body combination is then assembled to port 301 by engagement of threads 310 of bolt 309 with threads 302 of port 301. As torque is applied to hex head 320 of bolt 309, the mating tapers of bolt-to-body and of body-to-port create very high unit loading and invoke elastic memory between mating parts. The net result of the mating tapers is a coupling which seals at relatively low torques and, due to the elasticity in the interface, remains sealed over considerable time. Referring to FIG. 9, seals are formed at locations 324 and 325 which provide such an elastic interface. When o-rings 322 and 323 are used (see FIG. 10), the reliability of the system is enhanced considerably.

Figure 11:
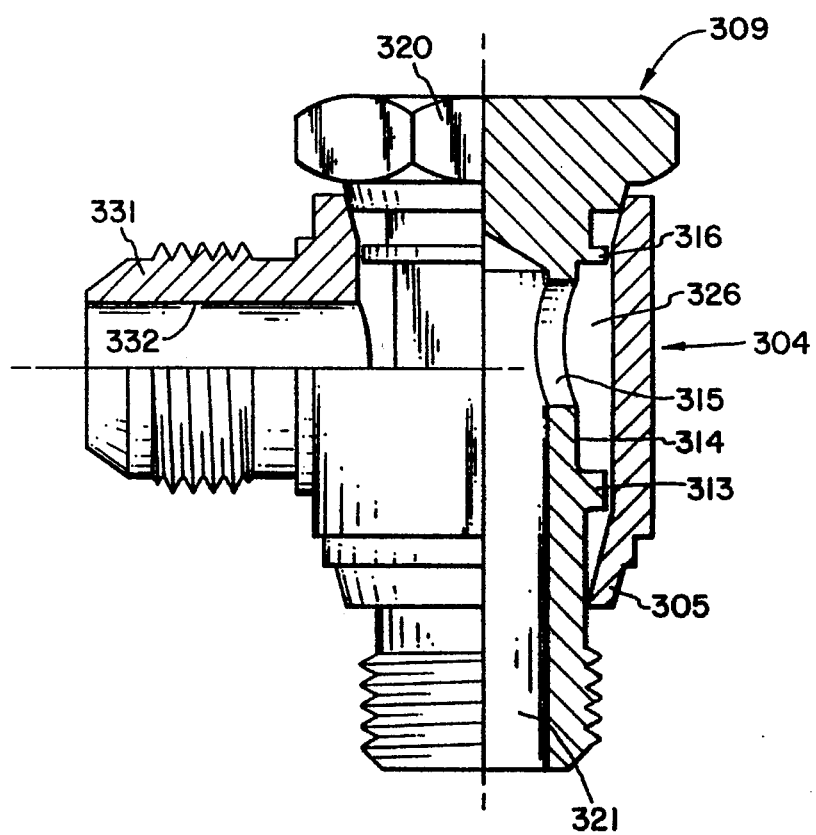
FIG. 11 is a side view, in partial cross-section, of the coupling of FIG. 8 showing a transverse passageway.

The internal fluid conduit provided by body 304 is defined by internal cylindrical wall 306 and bolt 309. Specifically, the conduit includes chamber 326, aperture 315, and bore 321. Chamber 326 is defined by wall 306 and outer surface 314 of bolt 309, and also may be further defined by extensions 313 and 316 of bolt 309. Bore 321 is in fluid communication with chamber 326 by virtue of aperture 315 which is located on outer surface 314. Referring to FIG. 11, another passageway 332, which is transverse to bore 321, is defined by arm 331 of body 309. Passageway 332 is in fluid communication with chamber 326 to thereby provide a fluid conduit for flow from a tube, or other device which may be attached to arm 331, to port 301.

Figure 12:
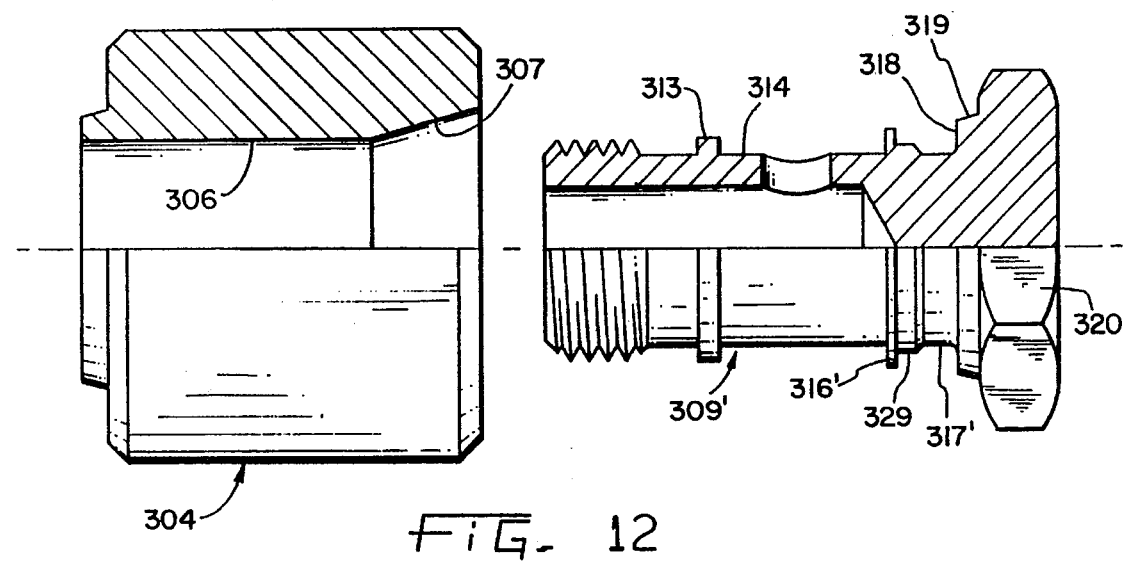
FIG. 12 is a side view, in partial cross-section, of a second embodiment of the transverse port fitting of the present invention before assembly.
Figure 13:
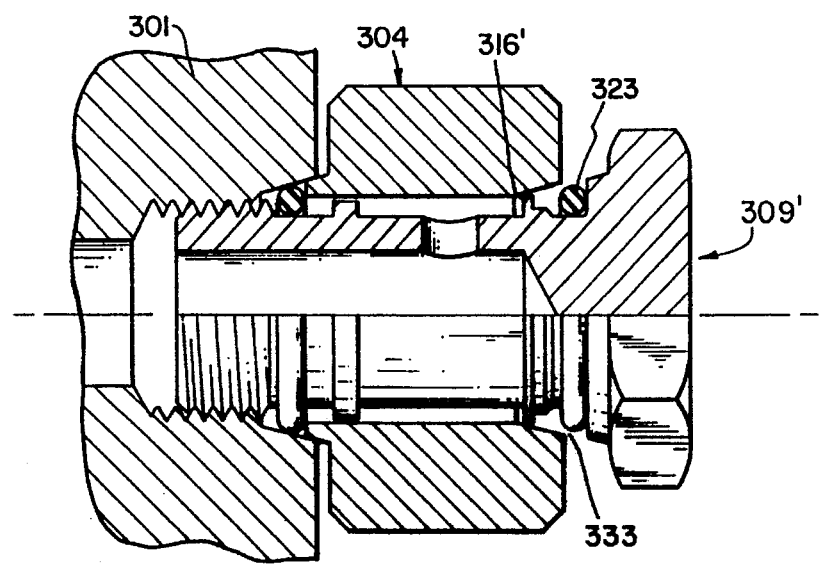
FIG. 13 is a side view, in partial cross-section, of the coupling of FIG. 12 after manual assembly and tightening.

An alternative embodiment of the transverse coupling is shown in FIGS. 12–14. This embodiment is similar to the embodiment of FIGS. 8–11 except for bolt 309' which has a different structure and arrangement between outer surface 314 and annular surface 318 which allows for easily detecting a coupling that is only manually tightened. Extension 316' of bolt 309' has an outer diameter which is greater than the diameter of internal cylindrical wall 306 so that when bolt 309' is manually tightened to port 301, extension 316' contacts tapered surface 307 and creates gap 333 which prevents o-ring 323 from forming a seal with tapered surface 307 (see FIG. 13). Thus, when bolt 309' is hand tightened to port 301, a leak will be apparent when pressurized fluid is directed through the coupling.

Upon subsequent tightening of bolt 309' with a tool, bolt 309" is sealingly connected to port 301. The tool tightening of bolt 309" forces extension 316" (see FIG. 14) into internal surface 306 and deform extension 316' into sealing contact 330 with wall 306. Raised portion 329 prevents o-ring 323 from being trapped by deformed extension 316", with raised portion 329 separating o-ring seating surface 317' from extension 316". Also, o-ring 323 is placed into sealing contact with tapered surface 307. These two seals are in addition to seal 325 formed between external taper 319 and tapered surface 307. Thus, tightening of bolt 309' by a tool creates deformed bolt 309" having three seals with body 304.

FIGS. 15 and 16 show a third embodiment of the transverse coupling including bolt 309'" having socket head 334. Generally circular socket head 334 includes flat face 335 and hexagonal recess 336 for receiving an allen wrench. With prior art hydraulic couplings, a great amount of torque is applied to the bolt in order to achieve proper sealing. If a socket head would be provided on a prior art design, then the internal sides of the socket would be stripped by the application of the required high tightening torque. Therefore, prior art couplings are constrained to using an exterior hex head design in order to receive the tightening torque. However, with the coupling of the present invention, lower tightening torques are required and socket head 334 may replace hex head 320 on the bolt and provide a more streamlined joinder with body 304 which also may be an easier method of tightening the bolt, i.e., with an allen wrench.

Figure 17:
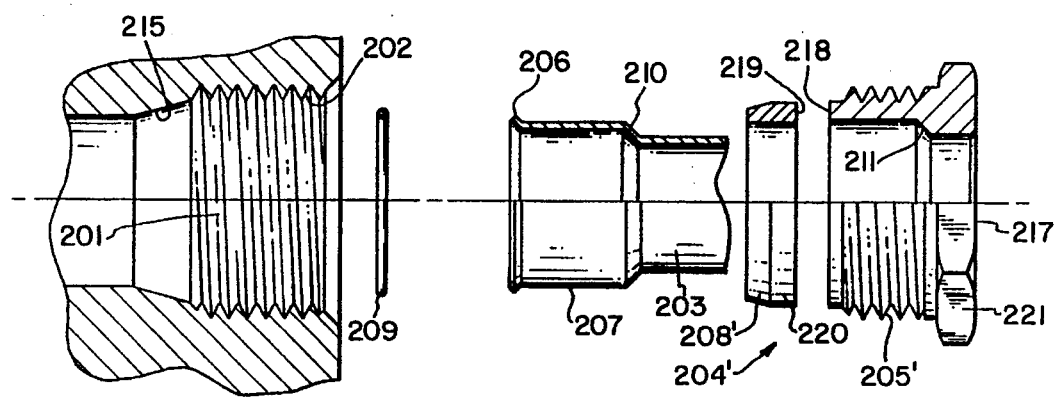
FIG. 17 is a side view, in partial cross-section, of a second embodiment of the tube-to-port coupling of the present invention before assembly.
Figure 18:
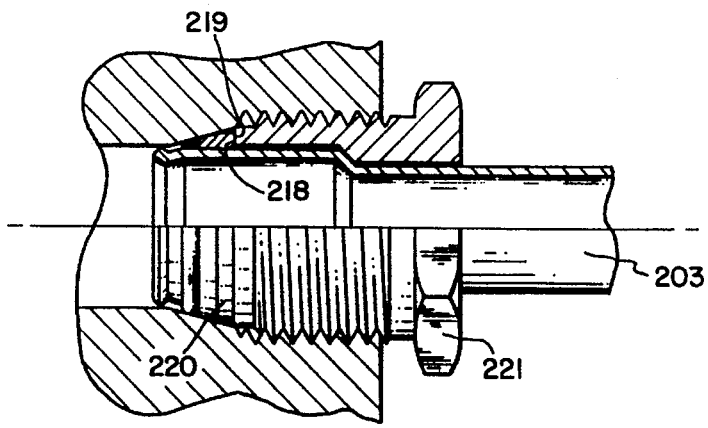
FIG. 18 is a side view, in partial cross-section, of the coupling of FIG. 17 assembled.

FIGS. 17 and 18 show a second embodiment of the tube to port coupling of the present invention. In the depicted embodiment, nut 204' comprises two separate components, engaging portion 217, with external threads 205', and metallic ferrule or compression ring 220, which includes thin wall 208'. This design is advantageous where regular disassembly of tube 203 from port 201 is required. Nut 204' is easier to rotate and remove from port 201 because thin wall 208' is left attached to expanded portion 207.

Referring to FIG. 17, tube nut 204' includes leading edge 218 oriented perpendicularly to the axis of nut 204', which abuts compression ring 220 at face 219. As nut 204' has torque applied during assembly, leading edge 218 presses against face 219 and thus forces compression ring 220 down tapered surface 215 of port 201 until a sealing contact is formed between thin wall 208' and expanded portion 207.

After assembly, this embodiment performs similarly to the embodiment shown in FIGS. 5–7.

Figure 19:
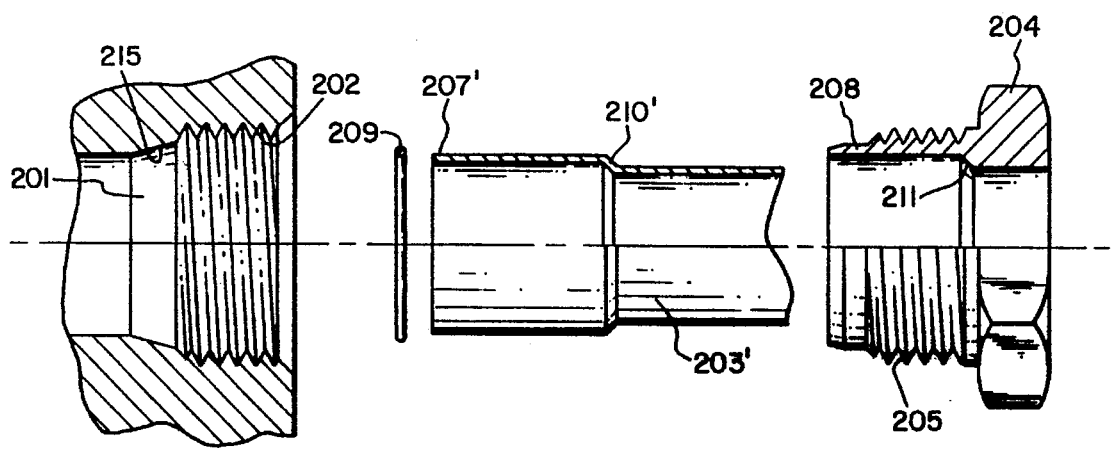
FIG. 19 is a side view, in partial cross-section, of a third embodiment of the tube-to-port coupling of the present invention before assembly.
Figure 20:
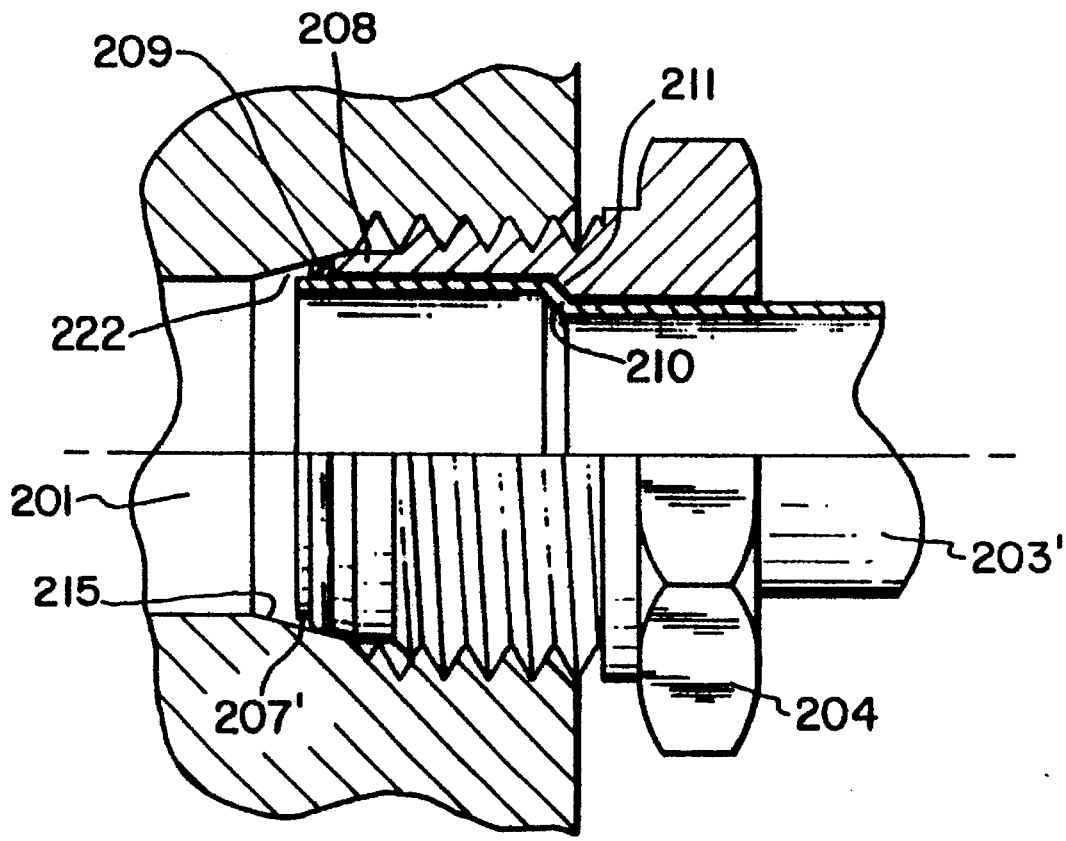
FIG. 20 is a side view, in partial cross-section, of the coupling of FIG. 19 assembled.

FIGS. 19 and 20 show a third embodiment of the tube-to-port coupling of the present invention. In the depicted embodiment, tube 203' does not include a lip, rather, expanded portion 207' extends into port 201 and provides a seating surface for o-ring 209. This design is advantageous where attachment of tube 203' to port 201 is desired to be done by only manual tightening of nut 204. Expanded portion 207 does not extend to contact tapered surface 215, but nut 204 presses o-ring 209 into sealing contact with tapered surface 215.

Referring to FIG. 20, seals are formed by o-ring 209 and thin walled portion 208. As nut 204 has torqued applied during assembly, thin wall 208 presses against o-ring 209 and thus forces o-ring 209 into sealing contact with tapered surface 215 of port 201 until a sealing contact is formed between thin wall 208 and expanded portion 207'. After assembly, this embodiment performs similarly to the embodiment shown in FIGS. 5–7 except that instead of a seal at 212 of FIG. 7, a gap 222 remains between expanded portion 207' and tapered surface 215.

In the preferred embodiment of the present invention, the connector portions of the hydraulic couplings (i.e., nut 204 of the tube to port coupling and bolt 309 of the transverse coupling) are made of material such as mild steel, stainless steel, monel, titanium, aluminum, brass, and various machinable alloys as well as certain plastics. The conduit portions of the hydraulic coupling (i.e., tube 203 and body 304) are made of material such as copper, brass, mild steel, stainless steel, titanium, aluminum, and various malleable/machinable alloys as well as certain plastics. The angle of the tapered surfaces of the coupling interfaces (i.e., tapered surfaces 215 of the tube-to-port, 303 of the banjo port, and 307 of the banjo body portion) is in the range of 5° to 45°, more particularly in the range of 10° to 30°, and preferably about 15°.

Further embodiments of the invention are shown in FIGS. 21–28, and are particularly useful for applications wherein the port member is made of softer materials. In order to form sealing contact around the circumference of the port without deforming the soft material of the port, tube 203" includes a tapered surface adapted to match the tapered surface of port 215 and nut 204" does not include a thin wall extending from external threads 205.

Figure 21:
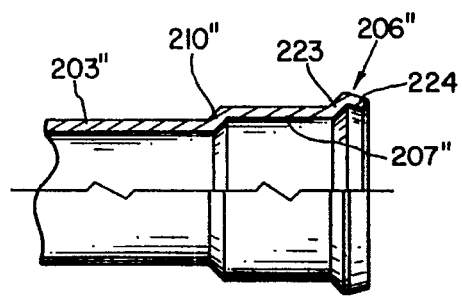
FIG. 21 is a side view, in partial cross-section, of an alternative embodiment of the tube formed in accordance with a tube-to-tube or tube-to-port coupling of the present invention.
Figure 22:
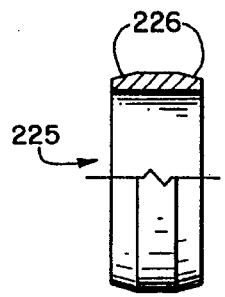
FIG. 22 is a side view, in partial cross-section, of a resin polymer or metallic ring of the present invention.
Figure 23:
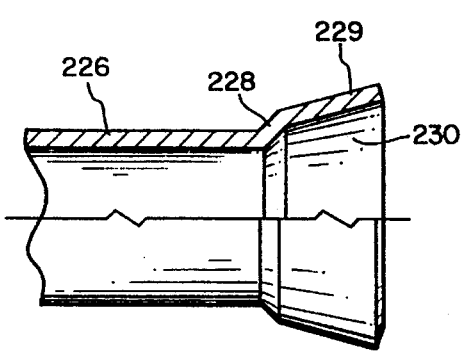
FIG. 23 is a side view, in partial cross-section, of a receiving tube of the tube-to-tube embodiment.
Figure 24:
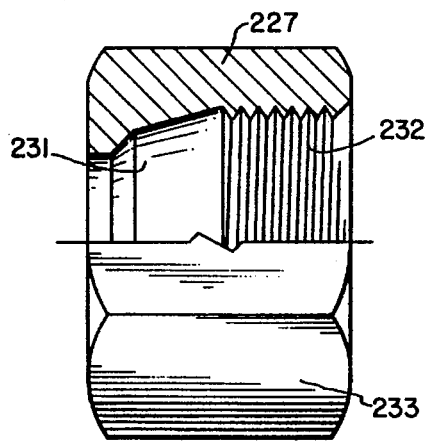
FIG. 24 is a side view, in partial cross-section, of a receiving nut of the tube-to-tube embodiment.
Figure 25:
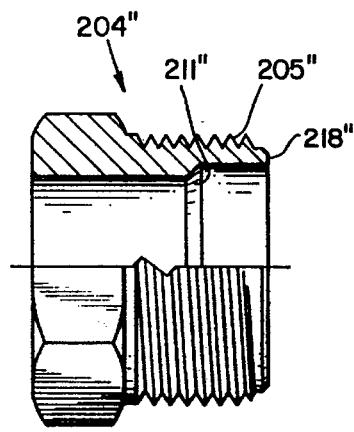
FIG. 25 is a side view, in partial cross-section, of a locking nut of either the tube-to-tube or tube-to-port embodiment.

An embodiment of the present invention providing a tube-to-tube coupling is shown in FIGS. 21–26. FIG. 21 shows the configuration of tube 203", which includes transition portion 210", expanded portion 207", and lip 206". In this embodiment, however, lip 206" includes out-turned portion 223 and in-turned portion 224. In-turned portion 224 has an outer tapered surface which is complementary to the taper of its port, the complementary tapered surface being less likely to damage a port made of a softer material. FIG. 22 shows resin polymer or metallic ring 225 which is adapted to slidingly engage the outer circumference of expanded portion 207". Generally annular in shape, ring 225 may include symmetrically located tapered surfaces 226. FIG. 25 shows nut 204" having external threads 205", shoulder portion 211", and leading edge 218", with nut 204" being arranged similarly to nut engaging portion 217 of 204' depicted in FIGS. 17 and 18 Nut 204", ring 225, and tube 203" form the male element of the tube to tube coupling of FIG. 26.

Figure 26:
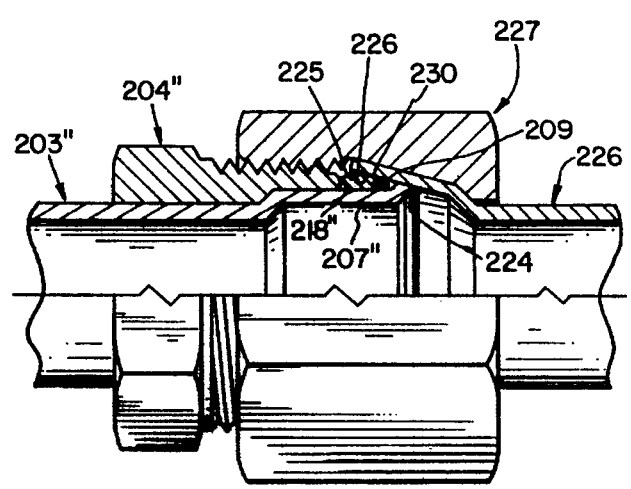
FIG. 26 is a side view, in partial cross-section, of the tube-to-tube embodiment assembled.

The female member of the tube to tube coupling of FIG. 26 is formed by combining receiving tube 226 and receiving nut 227. Receiving tube 226 is shown in FIG. 23 to include expanded portion 228 and outwardly flared end portion 229, with outer tapered portion 229 defining a port surface 230. Receiving nut 227 is shown in FIG. 24 to include tube end portion 231 which matingly receives the exterior surfaces of expanded portion 228 and tapered portion 229, internal threads 232, and external hex surface 233. External hex surface 233 provides a means for holding receiving nut 227 rotationally stationary relative to nut 204" so that they may be threadably engaged. The assembled tube to tube coupling is shown in FIG. 26, wherein nut 204" has forced ring 225 into an interference fit between expanded portion 207" and port surface 230, in-turned portion 224 of lip 206" engages port surface 230, and o-ring 209 may optionally be disposed on expanded portion 207" between ring 225 and in-turned lip portion 224.

FIGS. 21, 22, 25, and 27 show a fourth embodiment of the tube-to-port coupling of the present invention. In the depicted embodiment, port 201 is attached to tube 203" by a sealing mechanism comprising two separate components, nut 204" with external threads 205", and ferrule or ring 225 which may include tapered surfaces 226. This design is advantageous where regular disassembly of tube 203" from port 201 is required.

Figure 27:
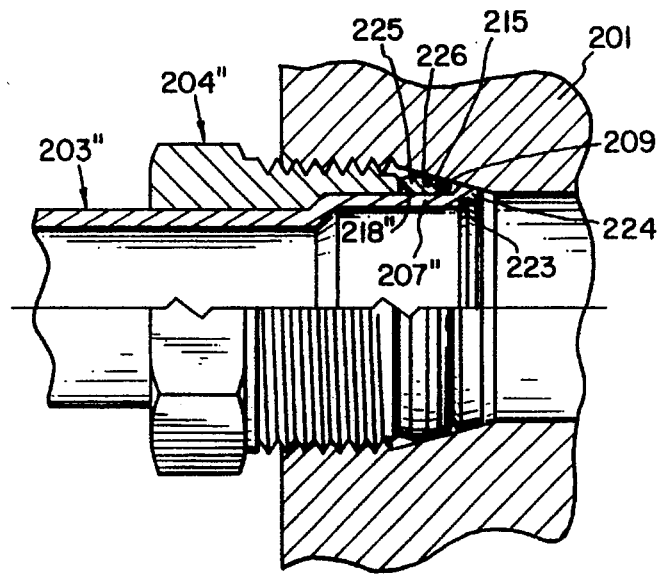
FIG. 27 is a side view, in partial cross-section, of a fourth embodiment of the tube-to-port coupling of the present invention.

Referring to FIG. 27, tube nut 204" includes leading edge 218" oriented perpendicularly to the axis of nut 204", which abuts ring 225. As nut 204" has torque applied during assembly, leading edge 218" presses against ring 225 and thus forces tapered surface 226 down tapered surface 215 of port 201 until a sealing contact is formed between the inner diameter of ring 225 and expanded portion 207". O-ring 209 may optionally be disposed about expanded portion 207" between ring 225 and out-turned lip portion 223. After assembly, this embodiment performs similarly to the embodiment shown in FIGS. 5–7.

Compression ring 225 itself may be captured in the tube forming process by feeding ring 225 into a milled recess in the external control die prior to the insertion of the raw tube. As the tube is expanded to form expanded portion 207", ring 225 may be captured and become an integral part of the tube endform although still capable of movement during final assembly of the port fitting.

Figure 28:
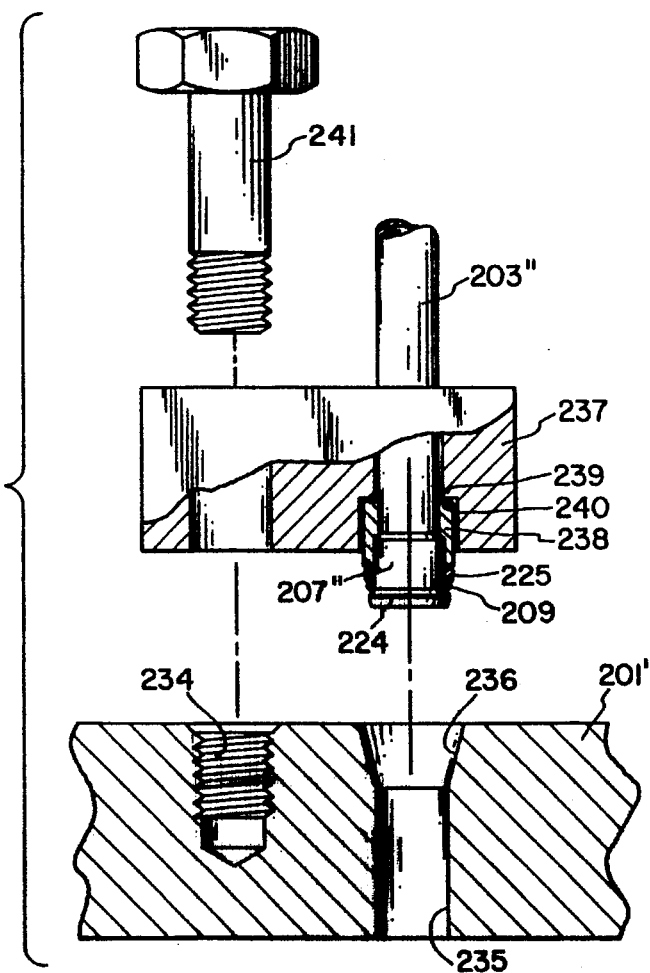
FIG. 28 is a side view, in partial cross-section, of a fifth embodiment of the tube-to-port coupling of the present invention.

FIG. 28 shows a fifth embodiment of the tube-to-port coupling of the present invention. In this fifth embodiment, the threaded engagement and the sealing interface are provided by two separate elements which are connected by a block. Specifically, port 201' includes threaded bore 234 and a separate passageway 235 having tapered portion 236. Tube 203" extends through block 237 and has locking element 238, optionally has separate ring 225, and optionally has o-ring 209 disposed around expanded portion 207". Block 237 includes annular stepped portion 239 having an inner diameter in abutting relation with the outer diameter of shoulder 240 of locking element 238. Thus, when bolt 241 is threadedly engaged with threaded bore 234 and tightened, block 237 applies pressure on locking element 238 sufficient to form the sealing contact between in-turned lip portion 224 and tapered surface 236 and the sealing contact of ring 225 between expanded portion 207" and tapered portion 236.

If made of resin polymer, ring 225 has the advantageous properties of being relatively impermeable to fluids and having a relatively hard outer surface for forming contact seals by interference fit. The material of resin polymer ring 225 is preferably that of TEFLON TM material made by DuPont. However, for the appropriate situations, ring 225 may alternatively be made of metal similarly to compression ring 220 of the embodiment of FIG. 17.

Figure 29:
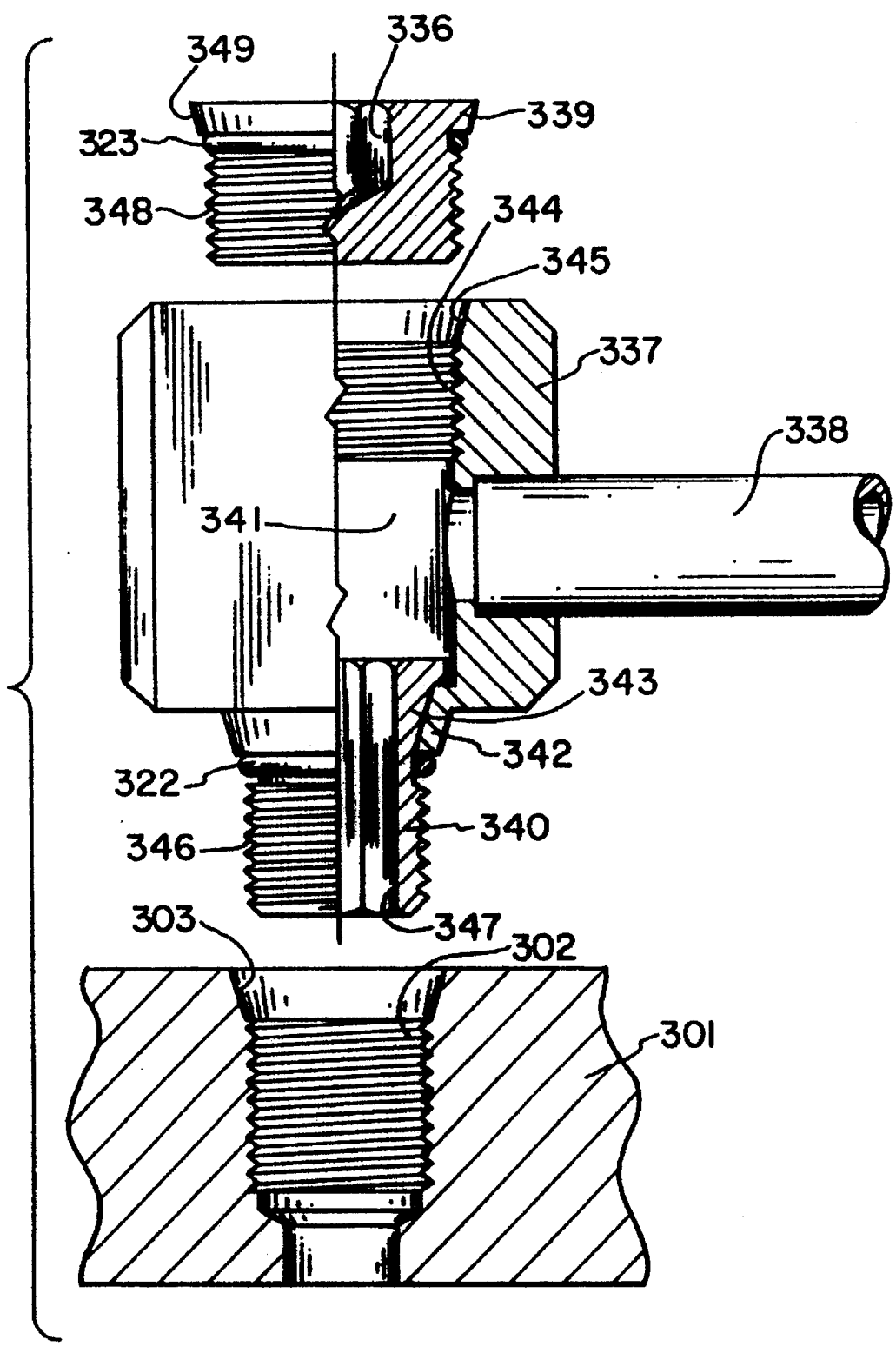
FIG. 29 is a side view, in partial cross-section, of a fourth embodiment of the transverse coupling of the present invention.

FIG. 29 shows a fourth embodiment of the transverse coupling of the present invention. In this embodiment, both the connector and the conduit elements are formed from two elements. The conduit element includes body 337 and tube 338, which is preferably connected to body 337 by brazing or the like. The connector element includes top engaging portion 339 and body engaging portion 340. Body 337 includes through aperture 341 which is in fluid communication with tube 338. Lip portion 342 is located at the bottom end of body 337 and defines an opening facing port 301. Lip portion 342 has an internal tapered surface which is complementary to external tapered surface 343 of port engaging portion 340, and an external tapered surface which is complementary to tapered surface 303 of port 301. Threaded portion 344 and internal tapered surface 345 are located at the top end of body 337 and are adapted to receive top engaging portion 339.

The fourth embodiment attaches to port 301 by first threadedly engaging threads 346 of port engaging portion 340 with internal threads 302 of port 301. Port engaging portion 340 includes hexagon shaped through aperture 347 which allows for an allen wrench or the like to be used to turn and tighten the engagement of threads 346 with threads 302. By tightening port engaging portion 340, lip portion 342 is forced into sealing contact between tapered portion 343 and tapered surface 303 of port 301. O-ring 322 may optionally be disposed around port engaging portion 340 between tapered portion 343 and threads 346 to enhance the reliability of the seal. Further, through aperture 347 allows for fluid communication between port 301 and tube 338. After port engaging portion 340 is secured in port 301, external threads 348 of top engaging portion 339 may be threadedly engaged with internal threads 344. Top engaging portion 339 includes hexagonal recess 336 which is adapted to receive an allen wrench for tightening. External taper 349 is located at the top of top engaging portion 339 and generally matches the shape of internal tapered surface 345 of body 337 so that a sealing contact is made when top engaging portion 339 is turned and tightened. O-ring 323 may optionally be disposed around top engaging portion 339 between threads 348 and external taper 349 to enhance the reliability of the seal.

Figure 30:
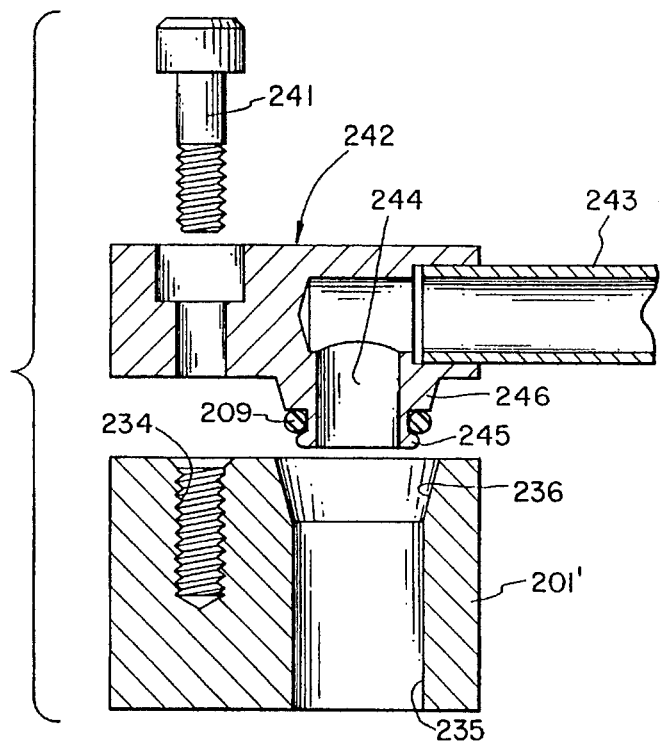
FIG. 30 is a side view, in partial cross-section, of a fifth embodiment of the transverse coupling of the present invention.

FIG. 30 shows a fifth embodiment of the transverse coupling of the present invention. Similar to the connection of the block and port in the embodiment of FIG. 28, bolt 241 of FIG. 30 secures block 242 to port 201'. However, transverse tube 243 is connected to passageway 244 of block 242, and tube 243 defines an axis located transverse to the axis defined by port passageway 235. Tube 243 may be attached to block 242 by brazing or the like. Block passageway 244 is in fluid communication with port passageway 235 and is sealed by lip portion 245 and wall portion 246. Optionally, o-ring 209 may be disposed in the groove between lip portion 245 and wall portion 246. When bolt 241 engages threaded bore 234 and is tightened, block 242 is securely fastened to port 201' and lip portion 245 and wall portion 246 are brought into sealing engagement with tapered portion 236.

Figure 31:
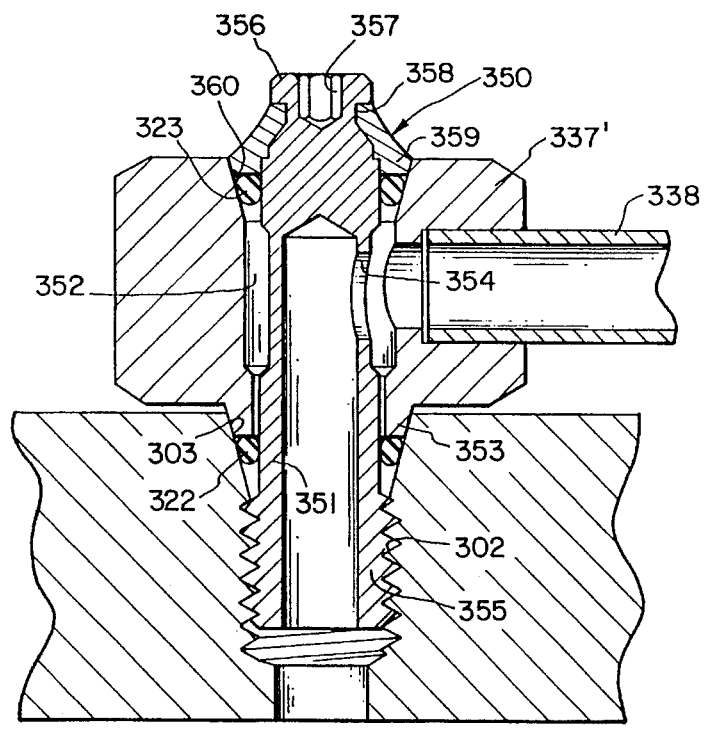
FIG. 31 is a side view, in partial cross-section, of a sixth embodiment of the transverse coupling of the present invention.

FIG. 31 shows a sixth embodiment of the transverse coupling of the present invention. In this embodiment, both the connector and the conduit elements are formed from two elements. The conduit element includes body 337' and tube 338, which is preferably connected to body 337' by brazing or the like. The connector element includes top engaging portion 350 and body engaging portion 351. Body 337' includes through chamber 352 which is in fluid communication with tube 338. Lip portion 353 is located at the bottom end of body 337' and defines an opening facing port 301. Lip portion 353 may have an external tapered surface which is complementary to tapered surface 303 of port 301. Engaging portion 351 has an internal bore in communication with a passageway of port 301, and aperture 354 provides fluid communication between the bore of engaging portion 351 and chamber 352. Engaging portion 351 also has threaded portion 355 which engages threads 302 of body 301, and top portion 356 with hex socket 357 and annular groove 358. Top engaging portion 350 comprises a collar which is located in a relatively fixed position relative to port engaging portion 351 between annular groove 358 of top portion 356 and body 337'; and collar 350 may be formed by locating a suitable ring of metal around port engaging portion 351 and striking the ring with a tapered die or the like to deform the material into collar 350 that fits between top portion 356 and body 337' and provides rim portion 359 with an external tapered surface matingly engaging tapered surface 360.

The sixth embodiment attaches to port 301 by first threadedly engaging threads 355 of port engaging portion 351 with internal threads 302 of port 301. Port engaging portion 351 may then be tightened to create an interference fit with collar 350, with external tapered surface 359 sealingly engaging tapered surface 360 of body 337'. O-ring 323 may optionally be disposed around port engaging portion 351 between aperture 354 and collar 350 to enhance the reliability of the seal. Port engaging portion 351 includes hex socket 357 which allows for an allen wrench or the like to be used to turn and tighten the engagement of threads 355 with threads 302. Tightening port engaging portion 351 also causes lip portion 353 to be forced into sealing contact with tapered surface 303 of port 301. O-ring 322 may optionally be disposed around port engaging portion 351 between tapered portion 353 and threads 355 to enhance the reliability of the seal. Further, a passageway is created through the bore of port engaging portion 351 and aperture 354 providing for fluid communication between port 301 and tube 338.

In the embodiment of FIG. 31, the connection of port engaging portion 351 to port 301 may alternatively be accomplished previous to securing body 337' to top portion 356. In this alternative method, body 337' is placed over the previously connected port engaging portion 351 and a ring for forming collar 350 is positioned on body 337'. The ring may then be struck with a die or the like to form collar 350 having external tapered 359. Port engaging portion 351 may be further tightened to enhance the interference fit of collar 350. This allows the preassembly of port engaging portion 351 to port 301, which may be advantageous in some manufacturing processes.

Figure 32:
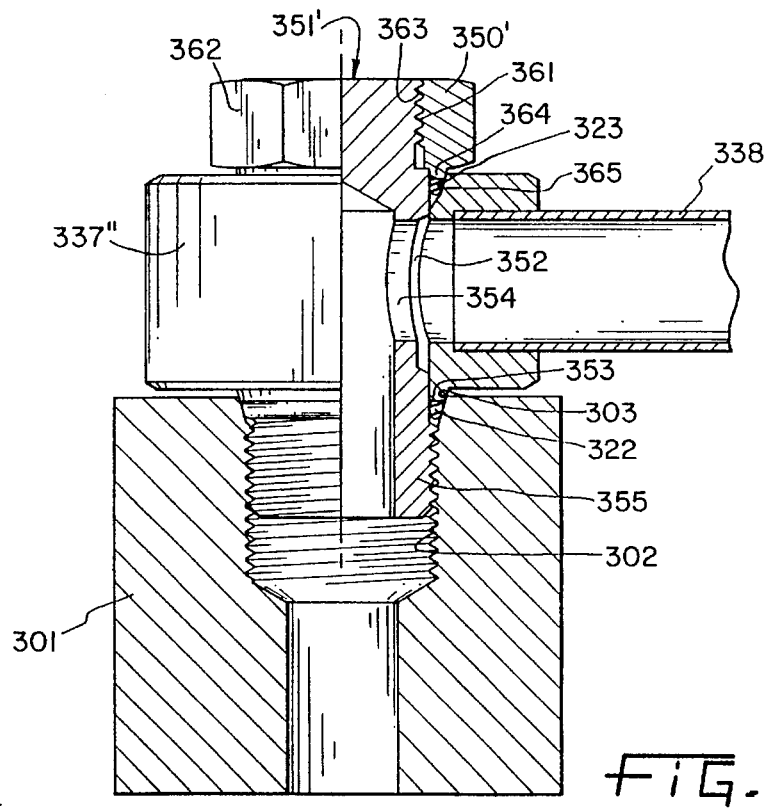
FIG. 32 is a side view, in partial cross-section, of a seventh embodiment of the transverse coupling of the present invention.

FIG. 32 shows a seventh embodiment of the transverse coupling of the present invention. In this embodiment, both the connector and the conduit elements are formed from two elements. The conduit element includes body 337" and tube 338, which is preferably connected to body 337" by brazing or the like. The connector element includes top engaging portion 350' and body engaging portion 351'. Body 337" includes through chamber 352 which is in fluid communication with tube 338. Lip portion 353 is located at the bottom end of body 337' and defines an opening facing port 301. Lip portion 353 may have an external tapered surface which is complementary to tapered surface 303 of port 301. Engaging portion 351' has an internal bore in communication with a passageway of port 301, and aperture 354 provides fluid communication between the bore of engaging portion 351 and chamber 352. Engaging portion 351' also has threaded portion 355 which engages threads 302 of body 301, and top portion 356 with external threads 361. Top portion 350' comprises hex head 362, internal threads 363 for engaging threads 361 and rim portion 364 with an external tapered surface which matingly engages tapered surface 365 of body 337".

The seventh embodiment attaches to port 301 by first threadedly engaging threads 355 of port engaging portion 351' with internal threads 302 of port 301. Top engaging portion 350' may then be threadingly engaged with threads 363 and tightened to create a contact seal with external rim portion 364 sealingly engaging tapered surface 365 of body 337". O-ring 323 may optionally be disposed around port engaging portion 351' between aperture 354 and top engaging portion 350' to enhance the reliability of the seal. Tightening top engaging portion 350' also causes lip portion 353 to be forced into sealing contact with tapered surface 303 of port 301. O-ring 322 may optionally be disposed around port engaging portion 351' between tapered portion 353 and threads 355 to enhance the reliability of the seal. Further, a passageway is created through the bore of port engaging portion 351' and aperture 354 providing for fluid communication between port 301 and tube 338. Alternatively, this embodiment may be preassembled by the manufacturer and shipped ready for assembly to port 301.

Figure 33:
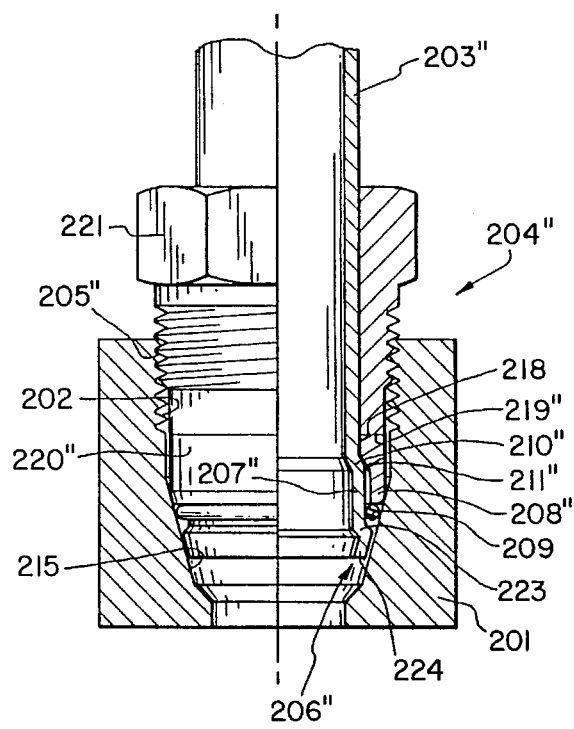
FIG. 33 is a side view, in partial cross-section, of a sixth embodiment of the tube-to-port embodiment of the present invention.

FIG. 33 shows a sixth embodiment of the tube-to-port embodiment of the present invention. Tube nut 204" includes leading edge 218 oriented perpendicularly to the axis of nut 204", which abuts compression ring 220" at face 219". As nut 204" has torque applied during assembly, leading edge 218 presses against face 219" and thus forces compression ring 220" down tapered surface 215 of port 201 until a sealing contact is formed between thin wall 208" and expanded portion 207". After assembly, this embodiment performs similarly to the other embodiments of the tube-to-port fittings.

Advantageously in the embodiment of FIG. 33, compression ring 220" includes shoulder 211". Internal shoulder 211", which abuts transition portion 210", is more easily formed in compression ring 220", typically made of a softer material like brass, aluminum, or a resin polymer, than in nut 204", typically made of a harder metallic material. This is in contrast to the embodiment of, e.g., FIGS. 17 and 27, wherein the shoulder must be formed by a screw machining process.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic coupling comprising:

a port including an opening, a portion defining a passageway in communication with said opening, an internally threaded portion in communication with said passageway, and a tapered surface facing said opening;

conduit means for providing fluid communication between said port and a tube located transversely in relation to said port, said conduit means including a body defining an axial chamber and said body including an internally tapered surface facing away from said port, said conduit means also including an extension defining a channel transversely located in relation to said axial chamber, said channel and said passageway being in fluid communication, said conduit means further including a lip which deforms into sealing contact with said tapered surface of said port, said axial chamber extending from said internally tapered surface to the axially forward end of said lip; and connector means for sealingly securing said conduit means to said port, said connector means extending through said conduit means, said connector means including a body with an axial bore, said connector means also including a rim which sealingly contacts said internally tapered surface of said conduit means, said connector means further including an externally threaded portion adapted to engage said internally threaded portion of said port and by threaded engagement force said lip into sealing contact with said tapered surface of said port and force said rim into sealing contact with said conduit means;

said axial chamber being generally cylindrical with a substantially constant axial cross-section with the axis being generally coincident with the axes of said connector body and said passageway, said axial chamber being free of annular recesses, said connector body being generally cylindrical with a smaller radius than said axial chamber, said connector body and said conduit body defining an internal cavity within said axial chamber, and said connector body also including a hole in communication with said axial bore and said internal cavity, said internal cavity hole, and said bore forming a substantially unrestricted fluid flow path from said channel to said passageway of said port regardless of the angular orientation of said connector means.

2. The hydraulic coupling of claim 1 wherein said connector means includes a body with an axial bore and two annular projections, said conduit body, said connector body, and said annular projections define said internal cavity, and said hole is located between said annular projections whereby a fluid flow path is provided from said channel to said internal cavity and through said hole and said bore of said connector means to said passageway of said port.

3. The hydraulic coupling of claim 2 further comprising two sealing rings, wherein said connector means includes a first seating portion located between said lip and said external threaded portion on a first end of said connector means, and a second seating portion located adjacent to said annular projections on a second end of said connector means, said sealing rings located on said first and second seating portions of said conduit means.

4. The hydraulic coupling of claim 1 further comprising a sealing ring wherein said connecting means includes a seating portion receiving said sealing ring, said connecting means including an annular extension adjacent said seating portion with an outer diameter greater than the diameter of said axial chamber of said conduit means which prevents sealing contact between said sealing ring and said conduit tapered surface after manual tightening of said connector means, said annular extension being made of material which deforms only by the application of torques in excess of manually applied torques whereby manual tightening of said threaded engagement between said connecting means and said conduit means does not deform said annular extension.

5. The hydraulic coupling of claim 1 wherein said connector means includes a port engaging portion and a separate said rim, and said rim includes a portion engaging said conduit means.

6. The hydraulic coupling of claim 1 wherein said rim has tapered surface substantially complementary to said internally tapered surface of said conduit means.

7. The hydraulic coupling of claim 1 wherein said rim of said connector means is separate from said threaded means of said connector means, and said rim includes a collar disposed in a locking fit between said threaded means and said conduit means to thereby locate said rim in fixed relation to said threaded means.

8. The hydraulic coupling of claim 1 wherein said connecting means includes a socket head for receiving torque to rotate said connecting means.

9. The hydraulic coupling of claim 1 wherein said connector means includes threaded engagement means and a block, said block has integral rim and lip portions defining a portion of said axial chamber, said block includes a first opening for receiving said threaded engagement means, said block includes a second opening for receiving said conduit means, said block includes a third opening defined by said lip portion and disposed in facing relation to said port passageway, and said block provides fluid communication between said second opening and said third opening.

10. The hydraulic coupling of claim 1 wherein said threaded means and said rim of said connector means are separate, said threaded means includes a threaded cylindrical body and a through bore in communication with said axial chamber, and said rim includes means for engaging said conduit means body in an interference fit and thereby seal one end of said axial chamber.

11. The hydraulic coupling of claim 1 wherein said threaded means and said rim of said connector means are separate, said threaded means includes a cylindrical body with first and second external threads, and a through bore in communication with said axial chamber, said first external threads engage said port, and said rim includes internal threads engaging said second external threads of said threaded means.

* * * * *